Aug. 1, 1967 A. V. WHITE 3,334,242

CONFINED OUTPUT TRIGGER CIRCUIT

Filed April 9, 1963

Alan V. White
INVENTOR

BY Melvin Sharp
ATTORNEY 3,334,242
CONFINED OUTPUT TRIGGER CIRCUIT
Alan V. White, Houston, Tex., assignor to Texas Instruments Incorporated, Dallas, Tex., a corporation of Delaware
Filed Apr. 9, 1963, Ser. No. 271,676
10 Claims. (Cl. 307—88.5)

The invention relates to a trigger circuit and more particularly to a trigger circuit utilizing a transistor switch of the common-emitter configuration.

A principal object of the invention is a fast response time, low voltage, current mode trigger circuit which may be incorporated in storage devices for high speed digital computers which utilize the transformer gating circuit described in the copending application of Martin H. Graham, Ser. No. 166,488, entitled, "Computer Gating Circuit," filed Jan. 16, 1962, now Patent No. 3,235,847.

In said copending application, there is disclosed a system for transferring binary information stored in a first storage device to a second storage device wherein the output of the first storage device is directly connected to the input of the second storage device. This system requires that the output voltage range of the first storage device be outside the range of input voltages necessary to trigger the second storage device.

Accordingly, a primary feature of the invention is a trigger circuit having means therein for confining the output voltage to a range of values outside the range of voltage values necessary to trigger the circuit whereby, in a plurality of like trigger circuits, the output of one trigger circuit may be directly connected to the input of another trigger circuit without affecting the other trigger circuit.

Another feature of the invention is the above-mentioned trigger circuit having means therein for preventing saturation of the transistor switch.

Still another feature of the invention is the relation of component values for causing the output voltage to vary above and below ground depending on the condition of the trigger circuit.

The foregoing and other objects, features and advantages of the invention will be apparent from the following detailed description taken in connection with the appended claims and attached drawings in which:

The invention generally relates to a trigger circuit utilizing a transistor switch of the common-emitter configuration and includes an emitter-follower transistor and diode connected between the collector and base of the common-emitter transistor for preventing saturation of the common-emitter transistor. A trigger circuit of this type is illustrated and described in the Patent 2,887,542 issued to Blair et al. on May 19, 1959.

The invention, in a preferred embodiment, contemplates a trigger circuit of the above-described type which has predetermined component values in conjunction with an asymmetrical input device for confining the output voltage to a range of values which are different from that required to trigger the circuit. Therefore, the circuit would not trigger if its output were applied to its input.

Figure 1:
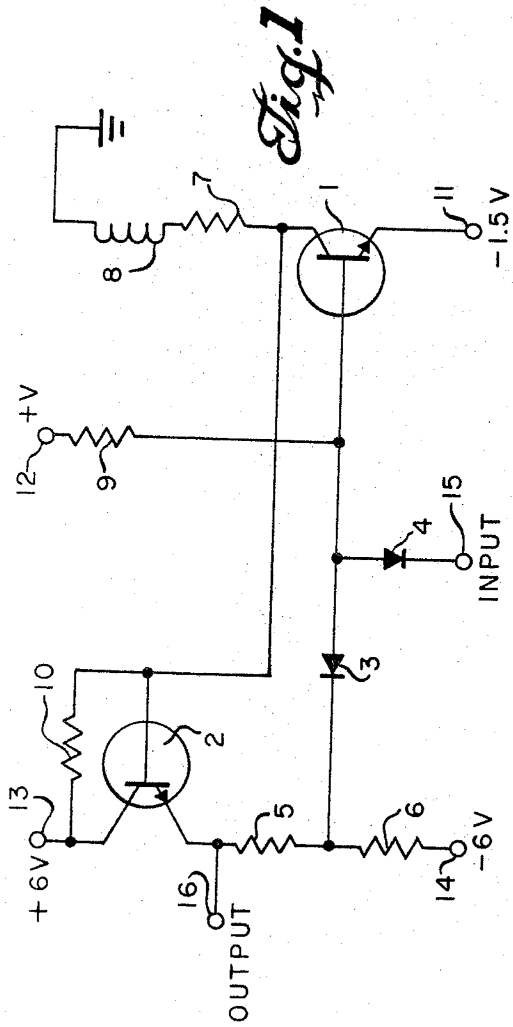
FIGURE 1 is a circuit diagram of the invention.

Referring now to FIGURE 1, N-P-N transistor 1 is connected in a common-emitter configuration. The emitter of transistor 1 is connected to a negative source at terminal 11, for example —1.5 volts, the collector of transistor 1 is connected to ground through resistor 7 and inductor 8 while the base of transistor 1 is connected to a positive source at terminal 12 through resistor 9. Such biasing applied to transistor 1 results in transistor 1 being normally conductive, that is, in its on condition. The base of common-emitter transistor 2 is directly connected to the collector of transistor 1 and the base of transistor 1 is connected to the output of emitter-follower 2 through diode 3 and voltage divider 5 and 6. A positive potential at terminal 13, for example +6 volts, and a negative potential at terminal 14, for example —6 bolts, in conjunction with the potential applied to the base of transistor 2 from the collector of transistor 1 normally sets transistor 2 in a slightly conductive condition, hereinafter referred to as transistor 2 being off. When transistor 1 is normally conducting, that is, near saturation, and transistor 2 is off, the potential applied across diode 3 causes it to be slightly conductive. Thus, the component values are chosen to be such that in a normal condition, transistor 1 is on the transistor 2 is off. The potential at output terminal 16, in the normal condition, is slightly negative with respect to ground, for example about —0.8 volt. A trigger of about —1.5 volts is necessary to forward bias diode 4 and turn it on. In consequence of diode 4 turning on, a reverse bias is applied to the base of transistor 1 turning it off. When transistor 1 turns off, its collector becomes more positive thereby turning transistor 2 on and the output potential at terminal 16 increases to a value slightly more positive than ground, for example about +0.8 volt.

Assuming that the output voltage swing at terminal 16 is from about +0.8 volt to —0.8 volt related to ground and that there is a direct connection between terminal 16 and terminal 15, it can be seen that the output voltage swing would be insufficient to trigger the transistor 1 either on or off. The diode 4 prevents positive potentials at terminal 16 from being applied to the base of transistor 1 and the negative potential at terminal 16 is insufficient to turn diode 4 on. Thus, a negative potential of about —0.7 volt would have to be added to the negative potential at terminal 16 in order to trigger the transistor 1 off. This arrangement makes the circuit illustrated in FIGURE 1 particularly suited for application to transformer gating as described in Patent No. 3,235,847.

By way of example only, some component values for the circuit illustrated in FIGURE 1 in conjunction with those already given above in order to confine the output voltage range at terminal 16 to be different than that required to trigger the circuit are as follows:

resistor 5 is 75Ω,
resistor 6 is 680Ω,
resistor 10 is 1.1 KΩ,
resistor 7 is 270Ω, and the potential applied to the base of transistor 1 by the voltage source at terminal 12 and resistor 9 is slightly more positive than the —1.5 volts at terminal 11 when the circuit is in its normal condition.

The transistor 1 is maintained in its unsaturated condition when it is on. This is accomplished by transistor 2 and diode 3 connected as shown in FIGURE 1. If transistor 1 begins to conduct more heavily than normal, that is, starts toward saturation, its base becomes more positive turning diode 3 on. When diode 3 turns on, the emitter-to-base current of transistor 1 is bypassed to the negative voltage source at terminal 14 thereby maintaining the voltage at the collector of transistor 1 at a positive potential with respect to the negative potential at terminal 11 which is insufficient to saturate transistor 1.

Figure 2:
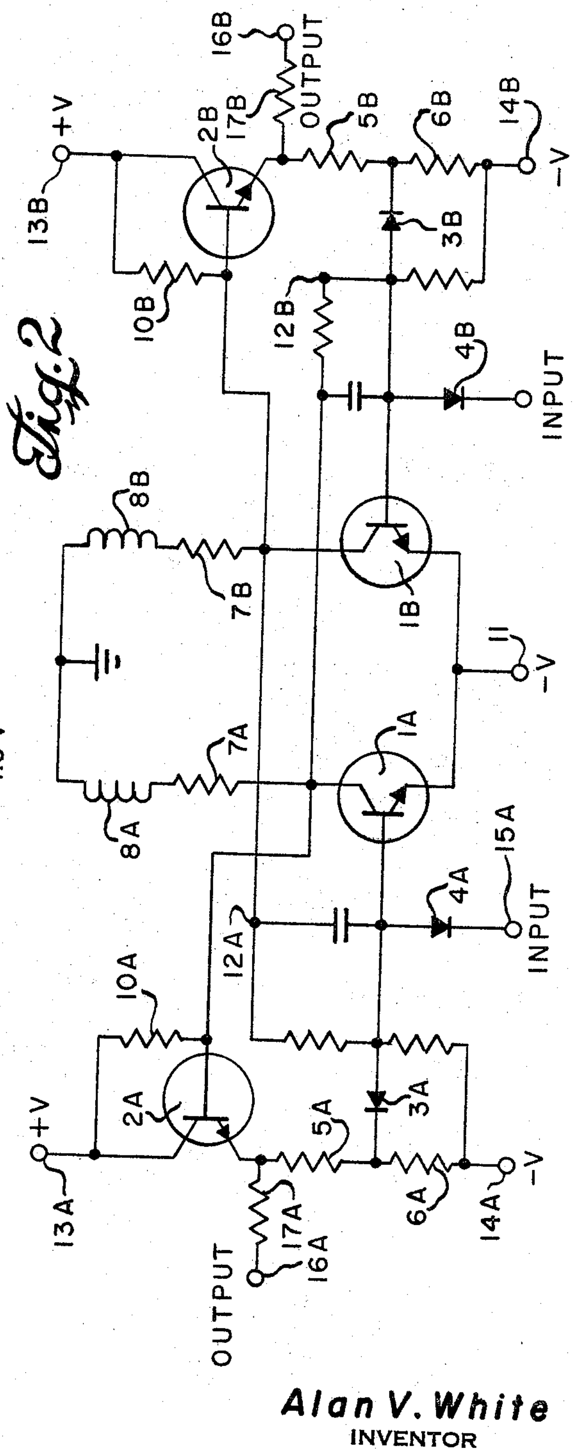
FIGURE 2 illustrates the utilization of the circuit of FIGURE 1 in a flip-flop.

The common-emitter transistor 1 and its associated circuitry illustrated in FIGURE 1 may be combined with a like circuit and arranged as a flip-flop. One such flip-flop circuit is illustrated in FIGURE 2 in which the A and B designations with like numerals connote similar parts in each half of the flip-flop and like numerals in FIGURES 1 and 2 connote similar parts performing equivalent functions. This flip-flop circuit represents duplicate FIGURE 1 circuits cross-coupled between their respective collector and base electrodes.

Referring now to FIGURE 2, assume that transistor 1A is on and transistor 1B is off. The voltage at terminal 12A corresponds to the voltage at terminal 12 in FIGURE 1. Likewise, with transistor 1B on and transistor 1A off, the potential at terminal 12B corresponds to the potential at terminal 12 in FIGURE 1. Assuming now that transistor 1A is on and transistor 1B is off, a negative trigger applied to terminal 15B does not affect the state of the flip-flop; however, a negative trigger applied to terminal 15A switches transistor 1A off which results in transistor 1B turning on. The operation and construction of the flip-flop illustrated in FIGURE 2 taken in conjunction with the description of the circuit in FIGURE 1 is apparent and therefore will not be further discussed.

It is to be understood that the above-described embodiments are merely illustrative of the invention. Numerous other arrangements may be devised by those skilled in the art without departing from the spirit and scope of the invention as defined by the appended claims.

What is claimed is:

1. A trigger circuit having an input terminal for application of a trigger potential thereto and an output terminal, comprising a transistor stage including a common-emitter transistor having a collector, emitter, and a base region, a potential source connected to said emitter region and having one polarity with respect to a reference potential connected to said collector region, said transistor being normally in one state of conduction, means responsive to the potential applied to said input terminal within a predetermined range for applying a potential to said base electrode which switches said transistor into another state of conduction, and means connected between said collector region and said output terminal for confining the potential at said output terminal to a range outside said predetermined range.

2. The trigger circuit of claim 1, wherein said last-mentioned means confines the potential at said output terminal to a range centered about said reference potential.

3. The trigger circuit of claim 2, wherein said transistor is normally on and is switched off when a potential within said predetermined range is applied to said input terminal.

4. The trigger circuit of claim 3, wherein said means responsive to the potential applied to said input terminal includes an asymmetrically conducting device connected between said input terminal and said base region.

5. The trigger circuit of claim 4, wherein like poles of said device and the base-to-emitter of said transistor are interconnected.

6. The trigger circuit of claim 5, wherein said means connected between said collector region and said output terminal includes an emitter-follower transistor, a voltage divider having two ends and an intermediate point, one of said end being connected to the emitter of said emitter-follower transistor along with said output terminal, asymmetrically conducting means connected between said intermediate point and said base region, said asymmetrically conducting means being poled in a direction opposite that of said asymmetrically conducting device, and the base electrode of said emitter-follower transistor being connected to the collector region of said common-emitter transistor, whereby said asymmetrically conducting means bypasses the base-emitter current of said common-emitter transistor to the other of said ends of said voltage divider whenever said common-emitter transistor tends towards saturation.

7. A trigger circuit having an input terminal for application of a trigger potential thereto and an output terminal, comprising a transistor stage including a common-emitter transistor having at least a base, emitter and collector electrodes, said transistor being normally in one state of conduction, means responsive to the potential applied to said input terminal within a predetermined range for applying a potential to said base electrode which switches said transistor into another state of conduction, wherein said means responsive includes an asymmetrically conducting device connected between said input terminal and said device, said device being poled in the same direction as the emitter-to-base of said transistor, and means connected between said collector electrode and said output terminal for confining the potential at said output terminal to a range outside said predetermined range, said last named means including an emitter-follower transistor, a voltage divider having two ends and an intermediate point, one of said ends being connected to the emitter electrode of said emitter-follower transistor along with said output terminal, asymmetrically conducting means connected between said intermediate point and base electrode of said common-emitter transistor such that like poles of said means and the base-to-emitter of said common emitter transistor are interconnected, and the base electrode of said emitter-follower transistor being connected to the collector electrode of said common-emitter transistor, whereby said asymmetrically conducting means bypasses the base-emitter current of said common-emitter transistor to the other of said ends of said voltage divider whenever said common-emitter transistor tends towards saturation.

8. A trigger circuit having an input terminal for application of a trigger potential thereto and an output terminal, comprising a transistor stage including a common-emitter transistor having at least a base, emitter and collector electrodes, said transistor being normally in one state of conduction, means responsive to the potential applied to said input terminal within a predetermined range for applying a potential to said base electrode which switches said transistor into another state of conduction, means connected between said collector electrode and said output terminal for confining the potential at said output terminal to a range outside said predetermined range, and means connected to the base of said common-emitter transistor for bypassing the base-emitter current of said common-emitter transistor when said common-emitter transistor tends towards saturation.

9. The trigger circuit of claim 8, wherein said means responsive to the potential applied to said input terminal includes an asymmetrically conducting device connected between said input terminal and said base.

10. The trigger circuit of claim 9, wherein like poles of said device and the base-to-emitter of said common-emitter transistor are interconnected.

References Cited

UNITED STATES PATENTS

| | | | |
|---|---|---|---|
| 3,067,342 | 12/1962 | Waller | 307—88.5 |
| 3,092,729 | 6/1963 | Cray | 307—88.5 |
| 3,193,701 | 7/1965 | Lawhon | 307—88.5 |
| 3,218,483 | 11/1965 | Clapper | 307—88.5 |

ARTHUR GAUSS, *Primary Examiner.*

J. JORDAN, *Assistant Examiner.*